US012640009B2

(12) United States Patent
Batsiokis et al.

(10) Patent No.: US 12,640,009 B2
(45) Date of Patent: May 26, 2026

(54) GAMING DEVICE WITH TRANSITIONING TRIGGER SYMBOLS MAPPED TO PROGRESSIVELY INCREASING CREDIT VALUES

(71) Applicant: Aristocrat Technologies Australia Pty Limited, North Ryde (AU)

(72) Inventors: Amy Batsiokis, North Ryde (AU); Lagan Gupta, Delhi (IN); Gaurav Goel, Uttar Pradesh (IN); Vishal Singh, Uttar Pradesh (IN); Dinh Tran, Wetherill Park (AU); Nicholas O'Sullivan, Beacon Hill (AU); Robbert Van Elven, Westleigh (AU); Lauren Chapple, Huntleys Cove (AU); Philip Seifert, Macquarie Park (AU); Tyson Elliott, Bardwell Valley (AU); Romit Aggarwal, Kellyville (AU); Sarah Boxall, Campbelltown (AU)

(73) Assignee: Aristocrat Technologies PTY Limited, North Ryde (AU)

( * ) Notice: Subject to any disclaimer, the term of this patent is extended or adjusted under 35 U.S.C. 154(b) by 248 days.

(21) Appl. No.: 18/492,496

(22) Filed: Oct. 23, 2023

(65) Prior Publication Data

US 2024/0355177 A1     Oct. 24, 2024

(30) Foreign Application Priority Data

Apr. 24, 2023    (AU) ................................. 2023202491

(51) Int. Cl.
$G07F\ 17/32$        (2006.01)
$G06F\ 7/58$          (2006.01)

(52) U.S. Cl.
CPC .......... *$G07F\ 17/3258$* (2013.01); *$G06F\ 7/588$* (2013.01); *$G07F\ 17/3213$* (2013.01); *$G07F\ 17/3267$* (2013.01)

(58) Field of Classification Search
CPC .............. G07F 17/3258; G07F 17/588; G07F 17/3213; G07F 17/3267
See application file for complete search history.

(56) References Cited

U.S. PATENT DOCUMENTS 5,086,429 A * 2/1992 Gray ................... G06F 11/2038
                                                      714/13
5,584,763 A * 12/1996 Kelly ........................ A63F 5/04
                                                      463/16

(Continued)

*Primary Examiner* — Jeffrey K Wong

(74) *Attorney, Agent, or Firm* — Armstrong Teasdale LLP

(57)            ABSTRACT

An electronic gaming device is provided. The gaming device includes a processor. The processor is programmed to: in response to transitioning to a feature game, cause one or more trigger symbols displayed on a reel display to transition to a credit symbol that includes a credit value wherein the credit value is determined by performing a lookup within a first award table, cause the reel display to spin causing a new trigger symbol to be displayed, cause the new trigger symbol to transition to a new credit symbol; and if a total number of credit symbols displayed on the reel display meets a first threshold value, assign a new credit value to the new credit symbol by performing a lookup within a second award table, wherein the second award table includes credit values that are greater than the credit values of the first award table.

20 Claims, 15 Drawing Sheets

(56)                 References Cited

U.S. PATENT DOCUMENTS

| | | | | |
|---|---|---|---|---|
| 6,378,042 B1 * | 4/2002 | Henderson | G06F 12/0802 | 711/134 |
| 10,726,678 B1 * | 7/2020 | Rehill | G07F 17/326 | |
| 2001/0009865 A1 * | 7/2001 | Demar | G07F 17/32 | 463/20 |
| 2001/0038178 A1 * | 11/2001 | Vancura | G07F 17/3244 | 273/274 |
| 2003/0013522 A1 * | 1/2003 | Muir | G07F 17/3202 | 463/36 |
| 2003/0050111 A1 * | 3/2003 | Saffari | G07F 17/3255 | 463/25 |
| 2004/0166922 A1 * | 8/2004 | Michaelson | G07F 17/34 | 463/20 |
| 2004/0172508 A1 * | 9/2004 | Nguyen | G06F 11/1666 | 711/162 |
| 2005/0017448 A1 * | 1/2005 | Scibetta | A63F 3/00157 | 463/9 |
| 2005/0056995 A1 * | 3/2005 | Tempest | G07F 17/34 | 463/20 |
| 2005/0236774 A1 * | 10/2005 | Loewenstein | G07F 17/32 | 273/303 |
| 2007/0057464 A1 * | 3/2007 | Cockrell | A63F 1/00 | 273/303 |
| 2007/0099695 A1 * | 5/2007 | Wilson | G07F 17/34 | 463/25 |
| 2008/0039190 A1 * | 2/2008 | Walker | G07F 17/32 | 463/25 |
| 2008/0146346 A1 * | 6/2008 | Hardy | G07F 17/329 | 463/16 |
| 2008/0188288 A1 * | 8/2008 | Seelig | G07F 17/3202 | 463/20 |
| 2008/0242421 A1 * | 10/2008 | Geisner | A63F 13/75 | 463/42 |
| 2009/0124371 A1 * | 5/2009 | Gilmore | G07F 17/3258 | 463/27 |
| 2010/0227668 A1 * | 9/2010 | Scibetta | G07F 17/3293 | 463/25 |
| 2012/0064961 A1 * | 3/2012 | Vancura | G07F 17/3265 | 463/20 |
| 2014/0114890 A1 * | 4/2014 | Fujimaki | G06N 20/00 | 706/12 |
| 2015/0072770 A1 * | 3/2015 | Simongini | G07F 17/3244 | 463/25 |
| 2015/0348371 A1 * | 12/2015 | Blazevic | G07F 17/322 | 463/11 |
| 2016/0063799 A1 * | 3/2016 | Reeves | G07F 17/326 | 463/17 |
| 2016/0358424 A1 * | 12/2016 | Thomas | G07F 17/3272 | |
| 2017/0092069 A1 * | 3/2017 | Pececnik | G07F 17/3269 | |
| 2018/0130285 A1 * | 5/2018 | Ang | G07F 17/3244 | |
| 2021/0241572 A1 * | 8/2021 | Marks | G07F 17/3213 | |
| 2024/0112542 A1 * | 4/2024 | Mirjavadi | G07F 17/3267 | |

* cited by examiner

300

|  | 341 | 342 | 343 | 344 | 345 |
|---|---|---|---|---|---|
|  | Reel Strip 1 | Reel Strip 2 | Reel Strip 3 | Reel Strip 4 | Reel Strip 5 |
| 301 | A | 10 | Q | 10 | PIC1 |
| 302 | PIC3 | J | K | PIC2 | SCAT |
| 303 | PIC3 | Q | 9 | PIC3 | PIC3 |
| 304 | PIC2 | PIC4 | PIC2 | 9 | Q |
| 305 | K | A | PIC1 | Q | A |
| 306 | PIC2 | SCAT1 | 10 | SCAT2 | Q |
| 307 | PIC3 | PIC1 | K | A | Q |
| 308 | A | J | WILD | 10 | WILD |
| 309 | J | Q | J | PIC2 | K |
| 310 | 10 | K | PIC3 | K | 9 |
| 311 | A | 9 | Q | PIC1 | PIC4 |
| 312 | PIC3 | K | PIC3 | SCAT1 | 10 |
| 313 | 10 | 10 | SCAT1 | A | 10 |
| 314 | PIC4 | SCAT2 | Q | J | Q |
| 315 | K | WILD | Q | 10 | A |
| 316 | PIC1 | J | 10 | A | 10 |
| 317 | J | J | A | PIC4 | K |
| 318 | Q | A | SCAT2 | 9 | A |
| 319 | PIC4 | PIC2 | PIC2 | 9 | J |
| 320 | A | PIC3 | Q | PIC2 | PIC3 |
| 321 | PIC1 | 9 | A | PIC1 | PIC4 |
| 321 | A | PIC3 | J | WILD | 10 |
| 323 | J | K | J | PIC3 | J |
| 324 | Q | SCAT3 | PIC4 | Q | Q |
| 325 | PIC2 | Q | 9 | SCAT1 | PIC3 |
| 330 | ... | ... | ... | ... | ... |

651
Determine and display total of current prize values at position of a new prize award symbol based on defined sequence 652
Repeat win prize award symbol?

653
Display updated total based on multiple of repeat win prize award symbol

Y

N

654
Award total value

655
Randomly select prize value

656
Last new prize award symbol?

N

Y

To step 660

1032 731 1035 1033 1034 1700

1437C

1136B 1035 1032 731 1033 1034 1800

1437A

1136B 1032 1938A 1939
731

1437E 1033 1136B 2220 2230 2210 2220

GAMING DEVICE WITH TRANSITIONING TRIGGER SYMBOLS MAPPED TO PROGRESSIVELY INCREASING CREDIT VALUES

CROSS-REFERENCE TO RELATED APPLICATIONS

This application claims the benefit of priority to Australia Patent Application No. 2023202491, filed Apr. 24, 2023, the contents and disclosures of which are hereby incorporated by reference herein in their entireties.

FIELD OF DISCLOSURE

The present application relates generally to a gaming device, and more specifically, to a method of operating a gaming device and a gaming computer system with trigger symbols having multiple display modes and progressively increasing credit values for improved control of return to player (RTP).

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her credit input to include differing numbers of paylines and/or the amount bet on each line. By varying the credit input, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected that correspond to that outcome. Notably, some games may include an element of skill on the part of the player and are therefore not entirely random.

SUMMARY

A particular implementation may include a gaming device that includes a spinnable reel display having a plurality of symbol positions, and at least one memory with computer executable instructions and a set of award tables stored thereon, and a game controller that includes at least one processor in communication with the memory and the user interface, where the instructions, when executed by the at least one processor, cause the at least one processor to cause a set of symbols to be displayed on the reel display including one or more trigger symbols, determine that a feature game has been triggered based on the set of symbols displayed on the reel display, and in response to transitioning to the feature game, cause the one or more trigger symbols displayed on the reel display to transition to a credit symbol including a credit value. The credit value for each of the one or more trigger symbols is determined by performing a lookup within a first award table of a set of award tables with a random number generator (RNG) output. The one or more processors may further cause the reel display to spin for the symbol positions that do not include one of the credit symbols, cause a new trigger symbol to be displayed in one of the spinning symbol positions, cause the new trigger symbol to transition to a new credit symbol, and if a total number of credit symbols displayed on the reel display meets a first threshold value, then assign a new credit value to the new credit symbol by performing a lookup within a second award table of the set of award tables with another RNG output, where the second table includes credit values that are greater than the credit value Another example embodiment includes a method of operating a gaming device comprising causing a set of symbols to be displayed on a reel display including one or more trigger symbols, determining that a feature game has been triggered based on the set of symbols displayed on the reel display, and in response to transitioning to the feature game, causing the one or more trigger symbols displayed on the reel display to transition to a credit symbol including a credit value, wherein the credit value for each of the one or more trigger symbols is determined by performing a lookup within a first award table of a set of award tables with a random number generator (RNG) output. The method further includes causing the reel display to spin for the symbol positions that do not include one of the credit symbols, causing a new trigger symbol to be displayed in one of the spinning symbol positions, causing the new trigger symbol to transition to a new credit symbol, and if a total number of credit symbols displayed on the reel display meets a first threshold value, assigning a new credit value to the new credit symbol by performing a lookup within a second award table of the set of award tables with another RNG output, wherein the second table includes credit values that are greater than the credit value A particular embodiment includes a display, a random number generator, and a memory storing symbol data defining a plurality of reel strips, at least some of the reel strips including one or more first trigger symbols, and wherein at least one reel strip includes at least one second trigger symbol having a first display mode in which the second trigger symbol shares a visual appearance of the first trigger symbols, and a second display mode in which the second trigger symbol has altered visual characteristics corresponding to a plurality of first trigger symbols. The method comprises conducting a base game by selecting, using the random number generator, symbols from the reel strips for a plurality of symbol positions, controlling the display to display the selected symbols at the plurality of symbol positions, wherein controlling the display includes, for each second symbol, displaying the second symbol as changing from the first display mode to the second display mode, and evaluating the selected symbols for winning symbol combinations. The method also comprises determining a total number of trigger symbols in the selected symbols, wherein a number of trigger symbols indicated by the second display mode of any second symbol in the second display mode is incorporated into the total, triggering a feature game upon the total number of trigger symbols being at least a threshold number of trigger symbols, and conducting the feature game by conducting, until an end condition is met, game instances in which symbols are selected at one or more symbol positions not already occupied by a held symbol, and making an award of at least prizes indicated by the symbols when the end condition is met.

Another example embodiment describes a system comprising at least one display, a random number generator, one or more processors, and at least one memory storing symbol data defining a plurality of reel strips, at least some of the reel strips including one or more first trigger symbols. At least one reel strip includes at least one second trigger symbol having a first display mode in which the second trigger symbol shares a visual appearance of the first trigger symbols, and a second display mode in which the second trigger symbol has altered visual characteristics corresponding to a plurality of first trigger symbols. Instructions executable by the one or more processors may cause the one or more processors to conduct a base game by configuring reel strips for the base game by selecting, using the random number generator, symbols from the reel strips for a plurality of symbol positions, and controlling the display to display the selected symbols at the plurality of symbol positions in the game window. Controlling the display includes, for each second symbol, displaying the second symbol as changing from the first display mode to the second display mode, and evaluating the selected symbols for winning symbol combinations. The instructions also cause the one or more processors to determine a total number of trigger symbols in the selected symbols, where a number of trigger symbols indicated by the second display mode of any second symbol in the second display mode is incorporated into the total, trigger a feature game upon the total number of trigger symbols being at least a threshold number of trigger symbols, and conduct the feature game by conducting, until an end condition is met, game instances in which symbols are selected at one or more symbol positions not already occupied by a held symbol, and outputting an award of at least prizes indicated by the symbols when the end condition is met.

BRIEF DESCRIPTION OF THE DRAWINGS

FIG. 3 illustrates an example reel strip layout.

DETAILED DESCRIPTION

Figure 1:
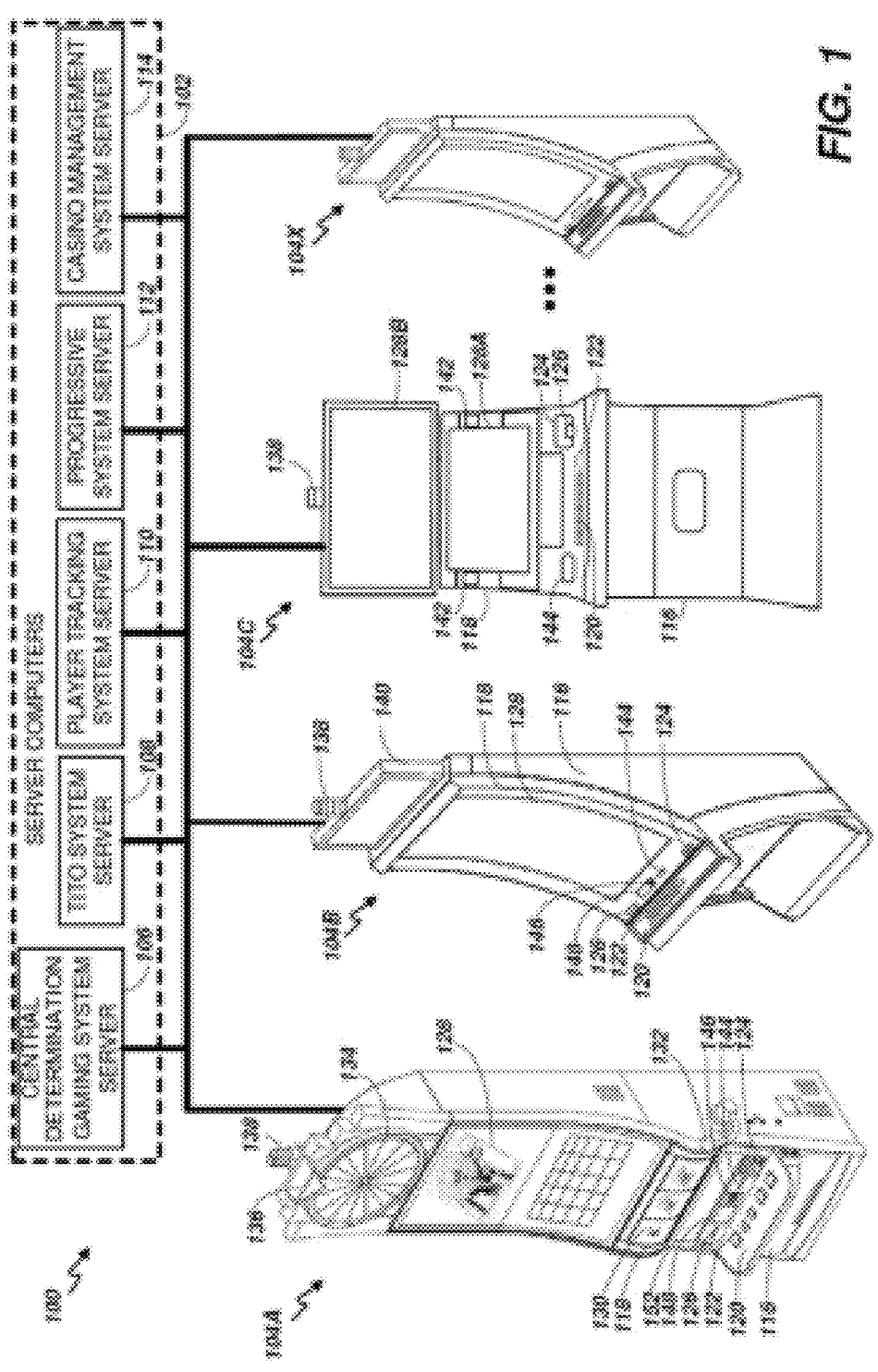
FIG. 1 is an exemplary diagram showing several EGMs networked with various gaming related servers.

Described herein is a gaming device, a method of operating a gaming device and a gaming system where progressively larger awards may be determined, totaled, and displayed to a user in the course of a spin game, rather than at the end of the game. The progressively larger awards may be initiated in response to trigger conditions associated with reel spins. For example, a trigger condition may meet a preset threshold requirement to cause a gaming controller to access an award table for an initial award. Subsequent reel spins and trigger conditions may result in the progressively larger awards being displayed through the duration of the spin game. The amounts of progressively larger awards may be controlled by virtue of the game controller accessing the award table to determine the award values, thereby enabling the gaming device to better control the amount of awards that are awarded during an instance of the game, which is sometimes referred to as return to player or RTP.

A set of symbols may be displayed on the reel display including one or more trigger symbols. The system may determine that a feature game has been triggered based on the set of symbols displayed on the reel display. In response to transitioning to the feature game, the system may cause the one or more trigger symbols displayed on the reel display to transition to a credit symbol including a credit value. The credit value for each of the one or more trigger symbols is determined by performing a lookup within a first award table of a set of award tables with a random number generator (RNG) output. The reel display may further spin for the symbol positions that do not include one of the credit symbols, and a new trigger symbol may be displayed in one of the spinning symbol positions. The new trigger symbol may transition to a new credit symbol. If a total number of credit symbols displayed on the reel display meets a first threshold value, then the system may assign a new credit value to the new credit symbol by performing a lookup within a second award table of the set of award tables with another RNG output. The second table includes additional credit values that are greater than the credit value. This may repeat using different threshold values for the number of credit symbols being displayed. In other words, the greater the number of credit symbols being displayed, the greater the likelihood of using an award table having larger awards included therein so that larger awards may be granted later in the feature game to help better control RTP since the awarding of awards happens each time a new trigger symbol is displayed in the feature game.

In a particular embodiment, the awards and/or progress towards the trigger conditions may be communicated through trigger symbols on reel strips. More particularly, the reel strips are configured so that trigger symbols can be selected during a base game which can cause a feature game to be triggered. Some trigger symbols on the reel strips are first trigger symbols that appear as single trigger symbols. Other trigger symbols are second trigger symbols having a first display mode in which the respective second trigger symbol shares a visual appearance with the first trigger symbols, and a second display mode in which the second trigger symbol has altered visual characteristics. Put another way, the first symbol (i.e., while in the first display mode) may be perceived by the player as transitioning to the second symbol (i.e., while in the second display mode). The feature game is triggered if a number of displayed trigger symbols incorporating those displayed in the second display mode of the second trigger symbols, satisfies the threshold requirement.

An implementation of a gaming system and associated method may include reel strips that are configured so that trigger symbols can be selected during a base game, which can cause a feature game to be triggered. Some trigger symbols on the reel strips are first trigger symbols that appear as single trigger symbols. Other trigger symbols are second trigger symbols having a first display mode in which the respective second trigger symbol shares a visual appearance of the first trigger symbols, and a second display mode in which the second trigger symbol has altered visual characteristics. The feature game is triggered if the number of displayed trigger symbols incorporating those displayed in the second display mode of the second trigger symbols, satisfies a threshold requirement.

Embodiments of the present disclosure represent a technical improvement in the art of electronic gaming machines, systems, and operations for such electronic gaming machines or systems. Technical improvements represented by the present disclosure include a system that may determine, total, and display progressively larger awards in the course of a spin game. This feature allows a user to see their awards and award totals during the course of the spin game, rather having to wait until the end of the game. The progressively larger awards may be generated using a random number generator (RNG) controlled by virtue of the game controller, which may access the award table(s) to determine eligible award values. The progressively larger awards may be initiated in response to trigger conditions associated with the reel spins. For example, a trigger condition may meet a preset threshold requirement to cause a gaming controller to access an award table for an initial award. Subsequent reel spins and trigger conditions may result in the progressively larger awards being displayed through the duration of the spin game. Accordingly, the gaming device described herein is configured to better control RTP by storing and using multiple award tables at different times within a feature game.

The initiating of the feature games may be based off of a number of trigger symbols that transition from a first display mode to a second display mode. This feature allows a player to visually track progress towards the feature game by recognizing the changing perceived appearances of the trigger symbols. Additionally, the player receives feedback and important information through a user interface having a limited amount of display real estate for displaying such information by progressively changing graphics with color and animation changes that are configured to effectively communicate such information to the user. Additional technical improvements to the gaming machine include one or more processors configured to conduct a base game by selecting, using a random number generator, a plurality of symbols from reel strips for a plurality of symbol positions, controlling a display to display the selected symbols at the plurality of symbol positions, where controlling the display includes, for each second symbol of the plurality of symbols, displaying the second symbol as changing from a first display mode to a second display mode. The processors may further evaluate the selected symbols for winning symbol combinations and determine a total number of trigger symbols in the selected symbols, where the total number includes any second symbol indicated by the second display mode and trigger a feature game upon the total number of trigger symbols being at least a threshold number of trigger symbols. The feature game may be conducted by conducting, until an end condition is met, game instances in which symbols are selected at one or more symbol positions not already occupied by a held symbol and outputting an award of at least prizes indicated by the symbols when the end condition is met.

These technical improvements are achieved in part by storing multiple award levels in the pay table(s) of the memory to control payouts. The game controller is configured to assign progressively larger award values in connection with trigger symbols and keep a running total of those awards during a game. The memory may additionally store the trigger symbols in association with multiple display modes. For instance, a first trigger symbol in a first display mode may share some aspects of a visual appearance of a second trigger symbol in a second display mode. Put another way, the second trigger symbol may comprise altered visual characteristics corresponding to the first trigger symbol. The number of displayed second trigger symbols in the second display mode may be tracked to initiate different game sequences, such as play of the feature game. The ability to use link operation of a feature game to a number of trigger symbols being presented in multiple display modes is a technical improvement that other known gaming systems are unable to achieve. Moreover, the ability to control the payouts of awards that progressively increase in the course of a spin game is a technical improvement that other known gaming systems are unable to achieve.

FIG. 1 illustrates several different models of EGMs that may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction that may be aligned in rows or banks of similar devices for placement and operation on a casino floor. The gaming device 104A often includes a main door 116 that provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 152 comprising a number (typically 3 or 5) of mechanical reels 130 with various symbols displayed on them. The reels 130 are independently spun and stopped to show a set of symbols within the gaming display area 118, which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel that may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used that is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 that may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 that may be used to initiate game play.

Figure 2:
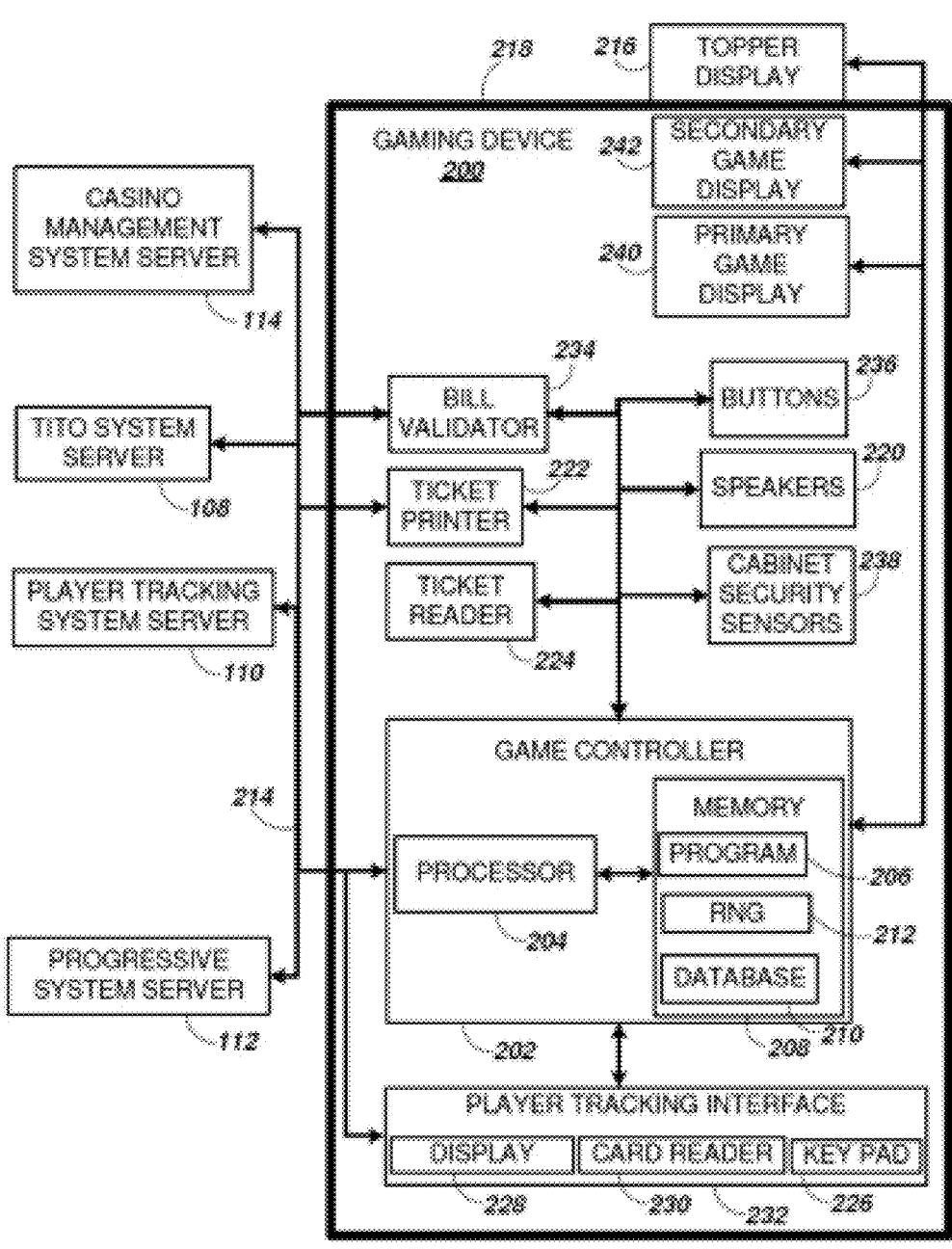
FIG. 2 is a block diagram showing various functional elements of an exemplary EGM.

Many or all the above described components can be controlled by circuitry (e.g., a gaming controller) housed inside the main cabinet 116 of the gaming device 104A, the details of that are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a service door 152 that opens to provide access to the interior of the gaming device 104B. The main or service door 152 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e., a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) that sits above main cabinet 218. The gaming cabinet 218 or topper display 216 may also house a number of other components that may be used to add features to a game being played on gaming device 200, including speakers 220, a ticket printer 222 that prints bar-coded tickets or other media or mechanisms for storing or indicating a player's credit value, a ticket reader 224 that reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each credit input and increased upon a win. The player can add additional credits to the balance at any time. The credit balance may be stored in a meter in memory 208 (or in a separate hardware meter). In some embodiment, memory 208 implements a credit meter to monitor to the credit balance and has a win meter that monitors any amounts won during any game instance(s) resulting from the credit input. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
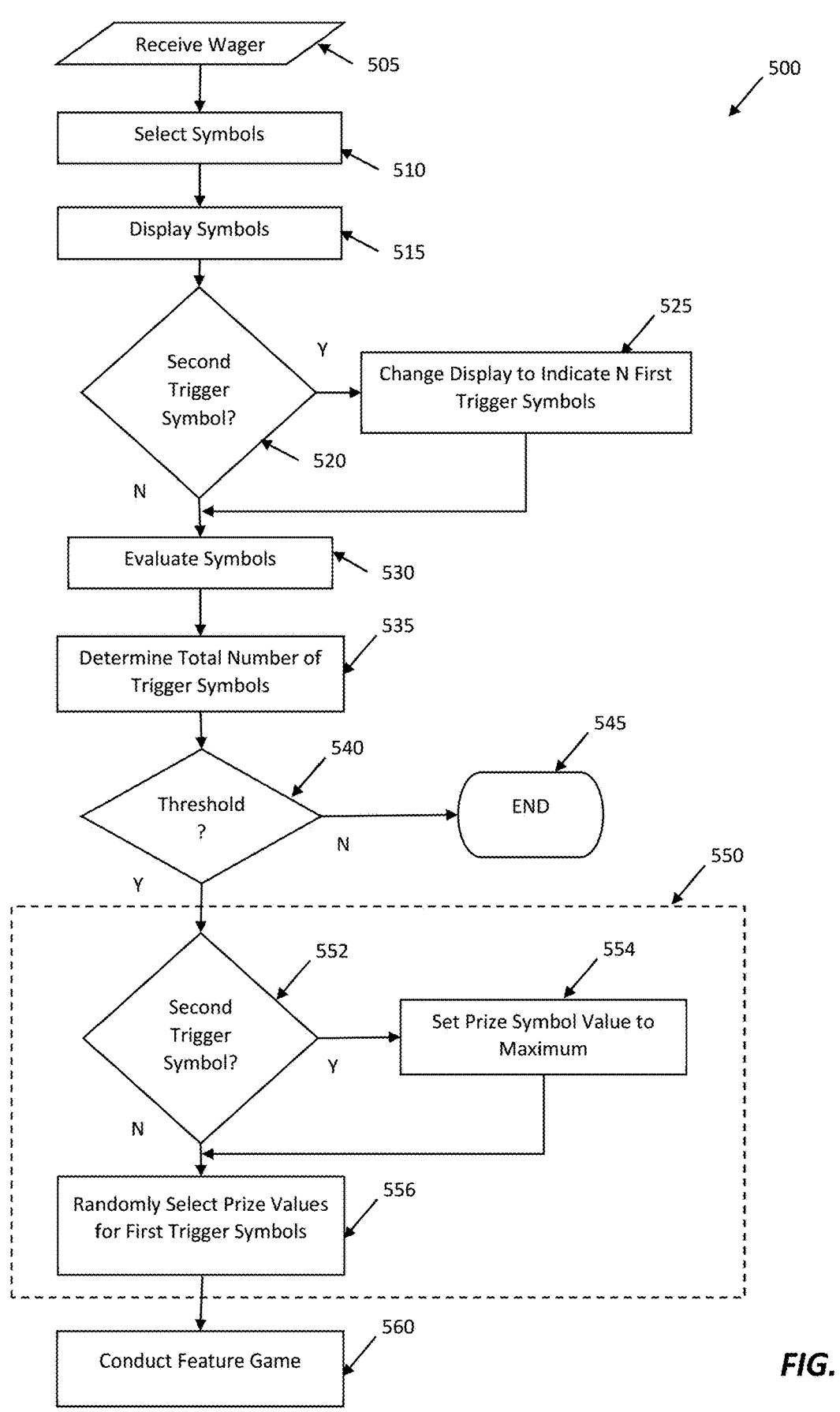
FIG. 5, FIG. 6A, and FIG. 6B are flow charts of a method of operating a gaming device.

FIG. 5 is a flow chart of an example embodiment of a method 500 of operating a gaming device. At step 505, the processor 204 initiates a first game instance (e.g., a base game) in response to receiving a credit input (e.g., in response to a player making a credit input selection using buttons as described above).

At step 510, the processor 204 selects symbols for a current game instance, in this respect, FIG. 3 illustrates an example of a set 300 of five-reel strips 341, 342, 343, 344, 345. In the example, for illustrative purposes, twenty-five reel strip positions 301-325 are shown for each reel strip 341-345. Each reel strip position of each reel has a symbol. For example, a "Wild" symbol occupies the twenty-first reel strip position 321 of the fourth reel 344. The symbols shown on the reel strip are generally indicative of symbols that may be employed in the embodiments, however, other reels strips to those illustrated in FIG. 3 can be used, for example, reel strips where two or more wild symbols are placed at consecutive reel strip positions of a reel strip. Symbol position 330 indicates that the reel strips 341-345 may have more symbols than illustrated. For example, the reel strips 341-345 could have between 30 and 100 reel strip positions with the last reel strip position of a respective reel strip being treated as contiguous with the first reel strip position 301 as would be the case with a mechanical reel. The actual lengths of the game reel strips depend on factors such as the lengths of the stacks, the number of wild symbols (in general, the more wilds there are, the longer the reel strip needs to be to maintain the target RTP), and volatility (in general, the higher the prize value is, the longer the reel strip needs to be to lower the hit rate to maintain the target RTP). In some examples, the reel strips associated with different columns may be of different lengths to one another.

The reel strips 341-345 have three different trigger symbols (SCAT1, SCAT2, and SCAT3 symbols), for example, the SCAT1 at the sixth reel strip position 306 of the second reel strip 342. In the examples described below, the trigger symbols each have related graphical components (in this example, the appearance of a Genie).

"SCAT" is an abbreviation of the term "scatter" that indicates that the position at which the symbol is displayed is not part of the evaluation by the processor 204 as to whether there are sufficient trigger symbols to meet the condition(s) for triggering feature game play. That is, the trigger symbols are counted by the processor 204 even though they appear at scattered symbol positions that are not on a pay line.

Figure 4:
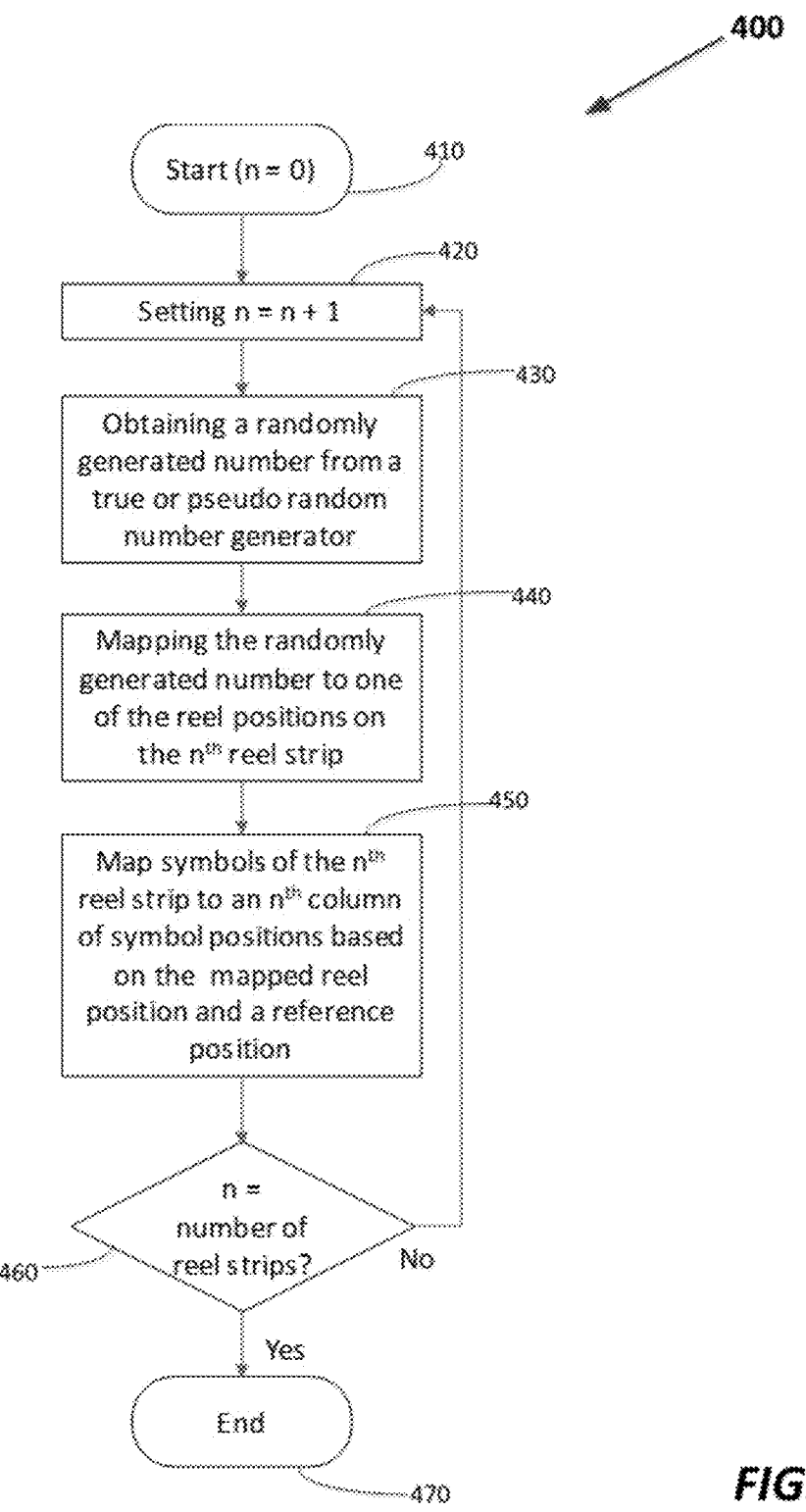
FIG. 4 is a flow chart of a symbol selection method.

FIG. 4 is a flow chart of an example method 400 carried out by the processor 204 to select symbols from reel strips at step 510. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. Referring to the example reel strips of FIG. 3, if the value returned by the RNG 212 is mapped to reel position 313 when three symbols are being selected from each reel, then for the first reel strip 341, "10" is mapped to a bottom symbol position, "PIC3" symbol 352 is mapped to a middle symbol position, and "A" symbol 351 is mapped to a top symbol position.

At step 460, the processor 204 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. In other examples, different numbers of symbols may be mapped to different numbers of symbol positions.

Figure 7:
FIGS. 7 to 22 are example screen displays.

After the symbols of all reel strips have been mapped to symbol position, at step 515, the processor 204 controls display 240 to display them at the symbol positions. An example of selected symbols for a first game instance is shown in the example screen display 700 of FIG. 7. FIG. 7 shows an example screen display 700 of a base game where symbols are selected from the five reel strips 341-345 for display in five columns of symbol positions 721-725 with three symbols being selected from each reel strip such that there are also three rows 711-713 of symbol positions.

In this example, the selected symbols include five trigger symbols 731-735, each of which has a visual appearance of a genie in accordance with a theme of the game. It will be observed that, trigger symbol 731 has a slightly different visual appearance to the other trigger symbols 732-735. This is to indicate that trigger symbol 731 is a third trigger symbol associated with additional game play as will be described below. In this example, the different visual characteristics of the third trigger symbol 731 include that the head of the genie is larger and the third trigger symbol incorporates some visual characteristics of a lamp, including that the color is gold as opposed to green for the other trigger symbols 732-735.

Example screen display 700 shows that when the trigger symbols 731-735 are initially displayed on display 240, the other trigger symbols 732-735 share a common visual appearance.

At step 520 the processor 204 determines whether the selected symbols include any second trigger symbols. In this case, processor 204 makes a positive determination at step 520 because trigger symbol 735 is a second trigger symbol. As a result, processor 204 proceeds to step 525 and controls the display 240 by changing the display of the second trigger symbol from a first display mode shown in screen display 700 to a second display mode shown in the example screen display 800 of FIG. 8 in which the second trigger symbol's visual appearance corresponds to a plurality of first trigger symbols, in this example two first trigger symbols 835A, 835B. The change from the first display mode to the second mode can incorporate an animation, for example, a cloud of smoke.

In this embodiment, the number of first trigger symbols revealed by each second trigger symbol is fixed at two. In other examples, the number may vary, for example, the second trigger symbol may reveal two or three first trigger symbols. In some examples, the number of first trigger symbols (e.g., two or three) is configured in the reel data defining the reel strips. In other examples, the number of trigger symbols revealed may be determined by the processor 204 using random number generator 212 and a weight table specifying a set of different multiples of the first trigger symbol and their relative probabilities of being selected. At step 30, the processor 204 evaluates the selected symbols for one or more winning combinations based on a pay table stored in memory. In this example, processor 204 applies a "pay line" type evaluation by processing the selected symbols to identify instances of the same symbol appearing in defined pay lines comprising one symbol from of the columns of symbol positions 721-725 starting with (and including) the first column. Upon there being one or more winning combinations, the processor 204 makes an award, for example, by adding credit amounts defined by the pay table to meter such as a win meter or a credit meter in memory 208.

At step 535, the processor 204 determines a total number of trigger symbols. In this example, the total number is determined from the number of first trigger symbols, any third trigger symbols, and the number of trigger symbols indicated by the second display mode of any second symbol.

At step 540, the processor 204 determines whether to trigger further game play based on whether the total number of first trigger symbols is at least a threshold value and, if not, the game instance, or sequence, ends at step 545.

In this example, the threshold number of trigger symbols is six. According in an example, such as that illustrated in connection with screen displays 700 and 800 shown in FIGS. 7 and 8, it initially appears that the processor 204 has selected five trigger symbols 731-735 as shown in screen display 700 and hence the threshold number has not been achieved. Then following the change of the second trigger symbol 735 to two first trigger symbols 835A, 835B as shown in screen display 800, the threshold number of trigger symbols is achieved and feature game play is triggered as described in further detail below. A particular implementation may at some point in a game sequence automatically provide enough trigger symbols to transition to the feature game (e.g., in the absence of the spins randomly providing them). For instance, the requisite trigger symbols may be automatically provided after a preset duration or number of spins. Accordingly, an advantage of this embodiment is that feature game play can be triggered by processor 204 in a case where fewer than the threshold number of trigger symbol positions are occupied by trigger symbols and the initial visual display of the selected symbols indicates that feature game play will not be triggered.

Figure 9:
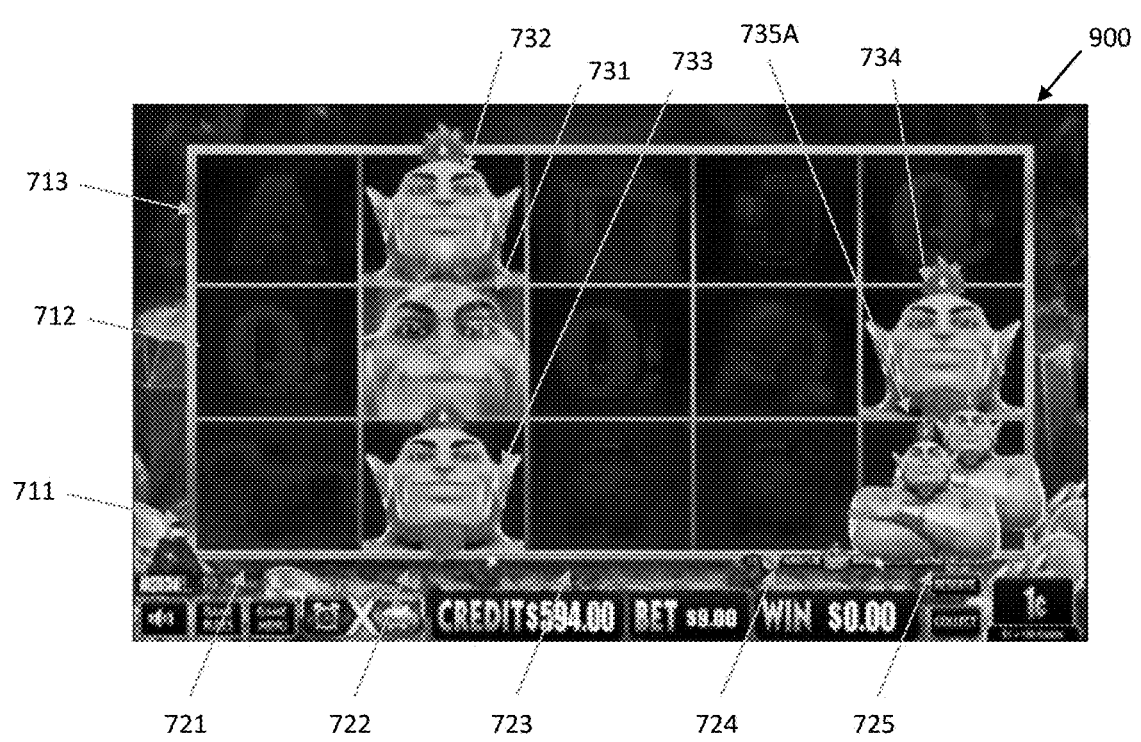

At step 550, the processor 204 transitions the display screen on display 240 to a feature game display screen and sets initial prize values for the feature game. That is, the feature game has been triggered based on the set of symbols displayed on the reel display. FIG. 9 is an example of an initial transitional screen display 900 of a feature game in which each trigger symbol 731-734, 735A is held in place and symbols are removed from all of the other symbol positions (in this case, ten other symbol positions). In this example, the color of each trigger symbol 732-734, 735A that is not already gold is changed to gold in the transitional screen display 900. This color change is to help communicate to the player that the trigger symbols 731-735 will be prize symbols for the purpose of the feature game.

Processor 204 allocates prize values to each first and second trigger symbol. For example, trigger symbols displayed on the reel display may transition to a credit symbol including a credit value. As discussed herein the credit value for each of the one or more trigger symbols is determined by performing a lookup within a first award table of a set of award tables with a random number generator (RNG) output.

In this example, the processor 204 allocates prizes differently for first and second trigger symbols. In this example, at step 552, processor 204 determines whether there are any second trigger symbols and if so, sets the prize value to a defined prize value at step 554. In this example the prize value is set to a maximum (or highest) prize value in the set of prize values. At step 556 processor 204 randomly selects prize values for each of the first trigger symbols from the set of prize values using random number generator and a weighted table stored in memory 208. In some examples, the prize values of the set of prize values may depend on the amount wagered on the base game instance. As described herein, the amount of the prize values may be controlled by the game controller accessing lookup tables of the pay table. The awards may progressively increase in value with each spin.

Processor 204 then controls the display 240 to show an initial feature game screen display 1000 (see FIG. 10) in which prizes have been allocated to each first and second trigger symbol such that they are prize value symbols 1032-1035 for the purpose of the feature game. While the appearance of third trigger symbol 731 remains unchanged, it is also a prize symbol for the purpose of the feature game as a prize of additional game play will be awarded by processor 204 at the conclusion of game play as explained in further detail below.

Figure 10:
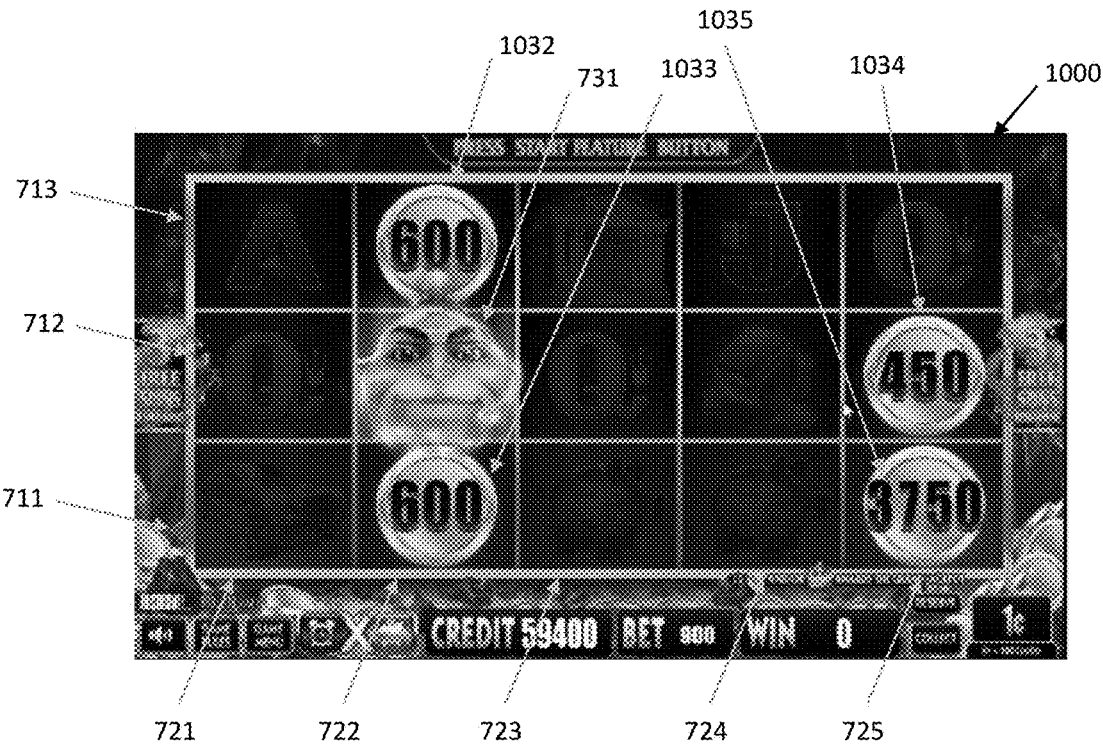

In the example of FIG. 10, the second trigger symbol 735 has become a highest prize value symbol 1035 having a value of 3750 credits and first trigger symbols 732-734 have become prize value symbols 1032-1034 having the respective values of 600 credits, 600 credits and 450 credits. The prize value 1035 is larger than the others and corresponds with the (dual genies) second trigger symbol 725. This sequence may give the player the impression that their award has doubled in step with the depicted genies doubling. A total credit award (i.e., 59,400 credit) may be displayed at the bottom of the screen 1000.

Processor 204 then proceeds to step 560 and conducts the feature game, which can broadly be categorized as a hold and spin game. An example embodiment of conducting the feature game is shown in more detail in FIGS. 6A and 6B.

Figure 6A:
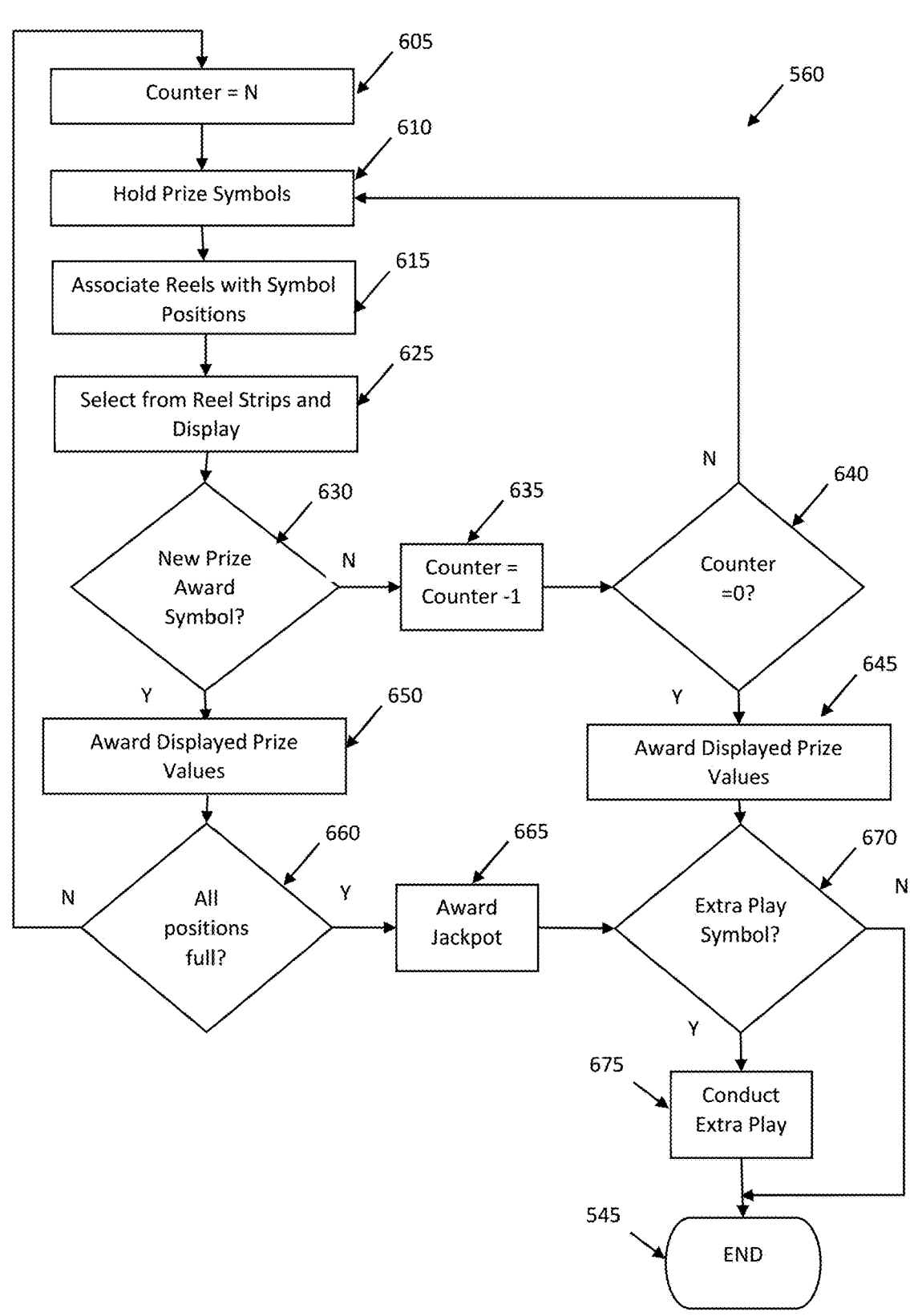
Figure 6B:
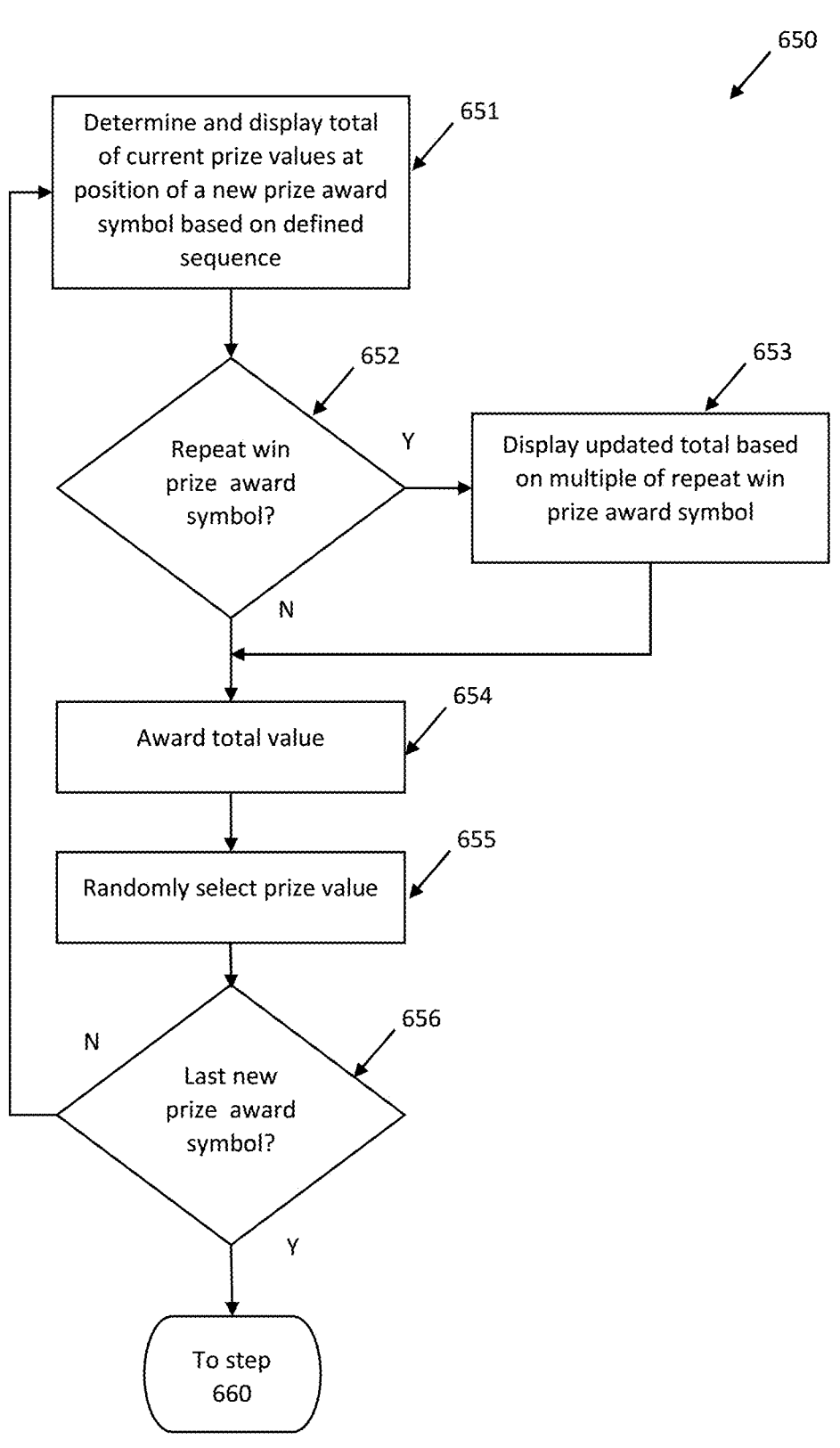

FIGS. 6A and 6B show an example of a process implemented by processor 204 to conduct the hold and spin games of the feature game.

At step 605, processor 204 sets an initial counter N for the hold and spin games that defines a minimum number of game instances, in this example to three game instances. At step 610, the processor 204 holds the prize symbols in place including the prize symbols shown in the initial feature game screen display 1000 of FIG. 10.

At step 615, the processor 204 associates reel strips stored in memory 208 with each individual symbol position that is not already occupied by a prize symbol. In an example, the reel strips used by processor 204 at step 615 comprise a mixture of prize award symbols and blank symbols. In another example, the reel strips include other symbols instead of blank symbols but the symbols are greyed out to indicate that they do not have a role in game play. In an example, a first reel strip is used to control the relative probability of all the symbol positions being filled, which in this example, results in a Grand Jackpot prize being awarded by processor at step 665. A Grand Jackpot is typically the largest standalone prize awardable by the gaming device 200. In an example, the processor 204 assigns the first reel strip to a symbol position first so that once only one symbol position remains the first reel strip will always be assigned to that symbol position. The first reel strip is typically longer than the other reel strips defined in memory 208 for the feature game and has very few (or only one) prize award symbols. When more than one symbol position remains, processor 204 randomly selects a symbol position with which to associate this first reel strip. Processor 204 the randomly select symbol positions and assigns reel strips from a separate, second set of reel strips having prize award symbols until all symbol positions not occupied by a held prize symbol have an associated reel strip.

In one example, the reel display may spin for the symbol positions that do not include one of the credit symbols. A new trigger symbol may be displayed in one of the spinning symbol positions, and the new trigger symbol may transition to a new credit symbol. For instance, at step 625, the processor 204 selects stopping positions for each of the assigned reel strips using a variant of the method described above in relation to FIG. 4. In this example, only a single position is mapped from each reel strip to a symbol position that either will or will not have a prize award symbol such that either a prize award symbol or a blank symbol will be mapped to the symbol position with which the reel strip is associated. In an example, the processor 204 displays the selected symbols (including blank symbols) at the symbol positions in a random order.

At step 630, the processor 204 determines whether the selection of symbols from the reel strips has resulted in a new prize award symbol being selected (and hence displayed). If at step 630, the processor 204 determines the selection has not resulted in a new prize award symbol being selected, at step 635, processor 204 decrements the counter by one. At step, the processor 204 determines whether the counter has reached zero. In this way, if a new prize award symbol is not selected in N consecutive game instances (in this example three game instances), there is no further selection of symbols from the reel strips.

Figure 11:
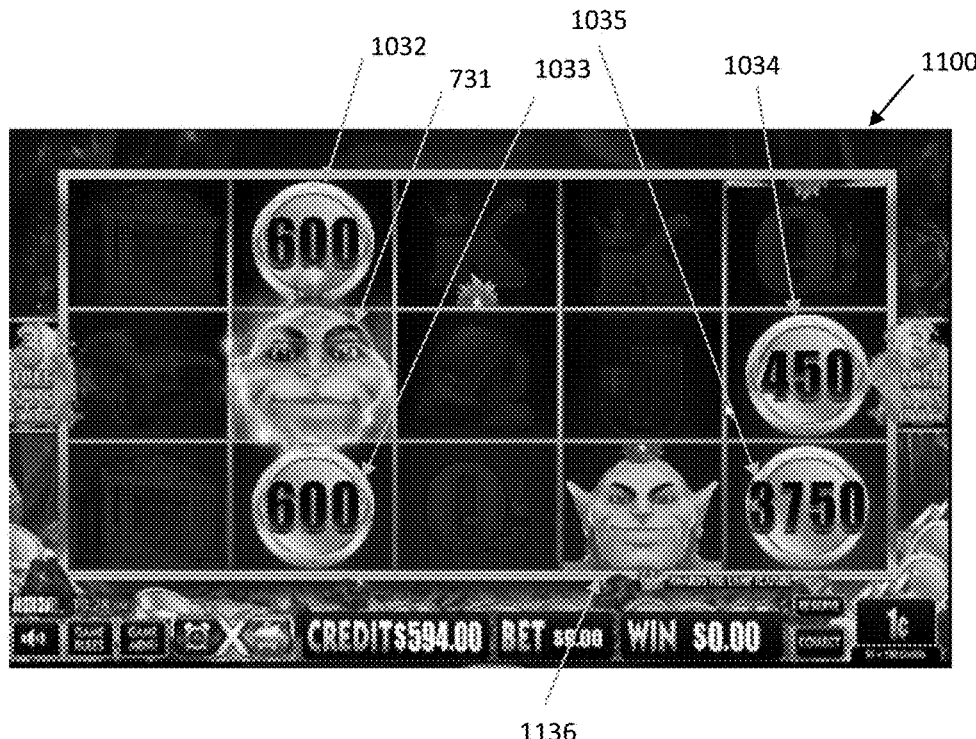

FIG. 11 is an example screen display 1100 where selection from reel strips at step 625 follows on from the screen display 1000 of FIG. 10. In this example, a new prize award symbol 1136 has been selected and is displayed in a landing state in which it has the appearance of a genie and hence is displayed in a manner consistent with transitional display 900.

As the selected symbols include a prize award symbol, processor 204 proceeds to step 650 and awards displayed prize values as shown in more detail in FIG. 6B.

As shown in FIG. 6B in sub-step 651 of step 650, processor 204 determines and displays a total of the currently displayed prize values at the position of a new prize award symbol. As explained in more detail below in connection with FIGS. 19 to 21, this is done in a defined sequence in a case where there is more than one new prize award symbol. In this example, the defined sequence comprises proceeding from the leftmost column 721 to the rightmost column 725, and within each column, from the top row 713 to the bottom row 711. It will be apparent that other evaluation orders can be used. According to a particular embodiment, if the total number of credit symbols displayed on the reel display meets a threshold value, then a new credit value may be assigned to the new credit symbol. As described herein, the system may perform a lookup within another award table of the set of award tables with another RNG output. The second table includes credit values that are greater than the credit value so that the awards may progressively grow in a controlled manner.

Figure 12:
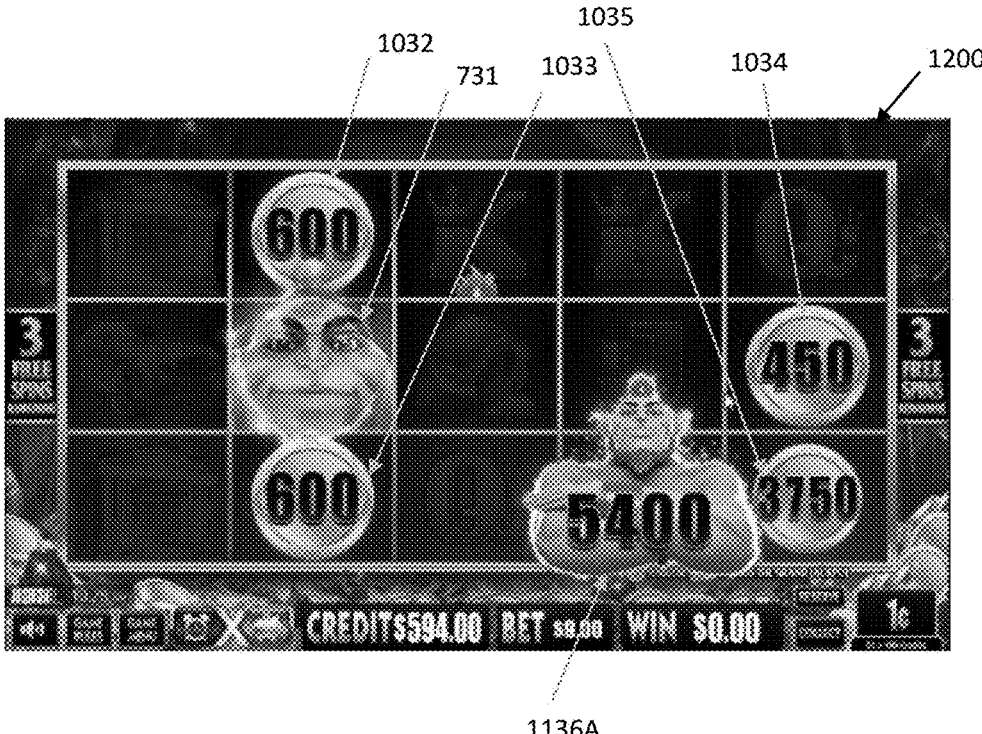

As shown in the example screen display of FIG. 12, this process includes the processor 204 controlling the display 240 to display the prize award symbol in an award state/prize award symbol 1136A, which in this example, comprises some common visual characteristics with the landing state 1136 in that the prize award symbol 1136A is a representation of a genie with a prize value superimposed. It will be observed that the displayed total of 5400 credits on prize award symbol 1136A corresponds to the sum of the credit values shown on the previously held prize symbols (i.e., 5400=600+600+450+3750). That is the values that were currently displayed on prize symbols 1032-1035 when the new prize award symbol 1136 was evaluated. In other words, when the new prize award symbol is displayed, it first communicates the total award awarded to the player by showing the total value (e.g., 5400) on the symbol, and then it determines what award table to use, based on the number of credit symbols currently displayed, to select a new award value for assigning to the new credit symbol. In this case, the new value assigned is 600 which is shown in FIG. 13 at 1136B.

In this example, the prize award symbols on the reel strips include repeat win prize award symbols and at step 652 processor 204 checks whether the new prize award symbol is a repeat win prize award symbol, and where it is not proceeds to step 654 and awards the displayed total value (e.g., by adding it to a meter).

Figure 13:
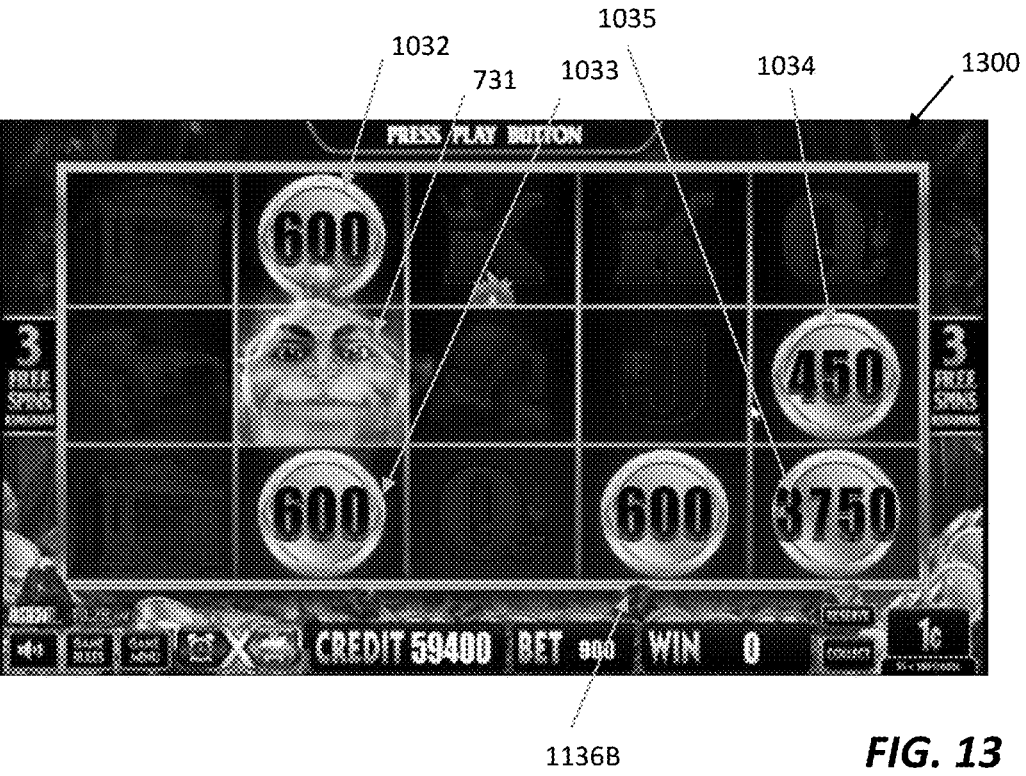

At step 655, the processor 204 randomly selects a prize value in the manner described in relation to step 556 and controls display 240 to replace the prize award symbol with a prize symbol 1136B as shown in FIG. 13. This example shows a case where a prize value of 600 credits has been selected for prize symbol 1136B.

It will be appreciated that in other examples, the prize values of individual prize symbols can be set at a different time. For example, by the values of prize symbols being pre-configured in the data defining the reel strips prior to the symbol selection step. In this example, when a prize award symbol is selected, the prize value of a corresponding prize symbol is already set in memory 208 but is not revealed until after the currently displayed prizes are awarded in respect of a newly selected prize award symbol and the display 240 is changed from showing the prize award symbol to the prize symbol.

At step 656, processor 204 determines whether this is the last new prize award symbol according to the defined sequence and, where it is (as is the case in FIG. 12 where only one new prize award symbol is selected), proceeds to step 660.

At step 660 processor 204 determines if all symbol positions are occupied with a prize symbol. If processor 204 makes a negative determination at step 650, processor 204 reverts to step 605 and resets the counter to N (in this example 3) before iterating through steps 610 to 630 again (and then through further steps that depend on whether or not one or more new prize award symbols are selected).

Figure 8:

After the counter reaches zero (that is, after all the hold and spin games have been conducted), processor 204 makes and award of prizes shown by the prize symbols at step 645.

Where one or more repeat win prize award symbols are selected, the processor 204 controls display of the repeat win prize award symbols so that their displayed behavior is similar to that of the second trigger symbols as described in connection with FIGS. 7 and 8.

Figure 14:
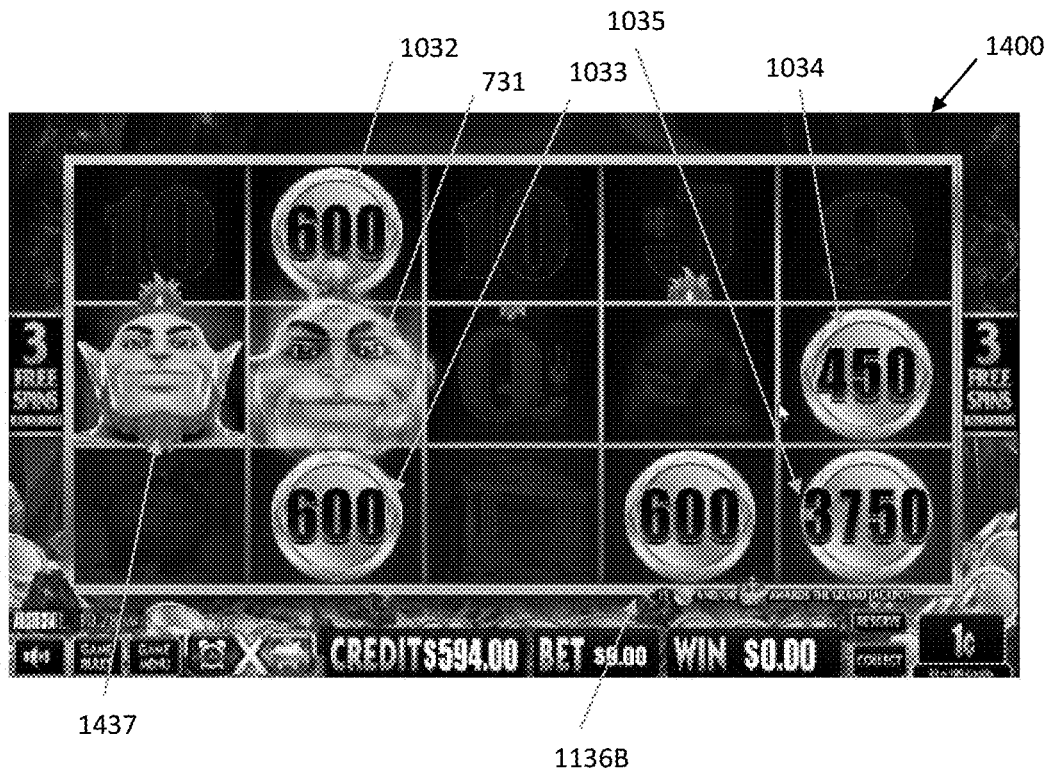

FIG. 14 is an example screen display 1400 that shows that an initial landing state of a repeat win prize award symbol 1437 has the same appearance as the landing state of other prize award symbols.

Figure 15:
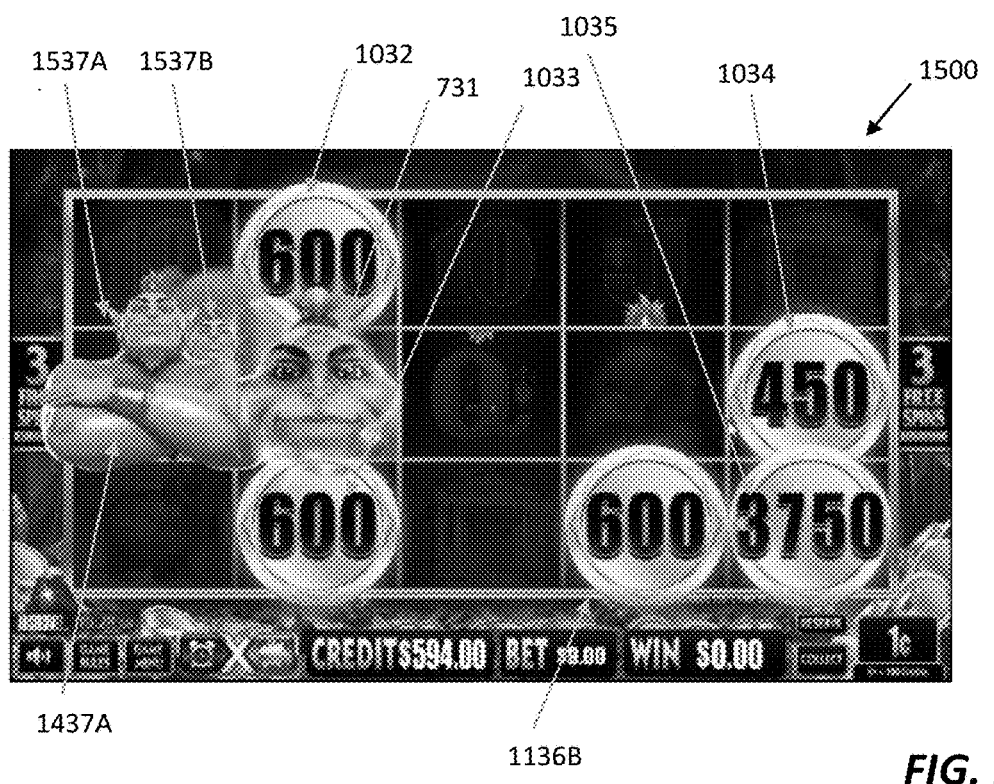

FIG. 15 shows that after the initial display, processor 204 controls the display 240 to show the repeat win prize award symbol in a reveal state 1437A. In this example, the reveal state 1437A involves displaying a first genie 1537A in the foreground and a second genie 1537B in the background. Again, the common visual characteristics of these graphical elements help communicate the function of the repeat win state/prize award symbol 1437A.

Figure 16:

As shown in FIG. 6B, the presence of a repeat win prize award symbol results in different processes being conducted by processor 204. At step 651, the processor 204 determines and displays the repeat win prize award symbol in an initial prize award state 1437C showing the total value of current prize values. In this example, 6000 credits (i.e., 600+600+600+450+3750=6000) as shown in example screen display 1600 of FIG. 16. Note that background genie 1537B continues to be displayed in the initial prize award state 1437C to indicate that the prize award will be modified.

In this example, processor 204 will make a positive determination at step 652 and accordingly proceed to step 653 and display an updated total based on a multiple of a repeat win symbol. In this example, the multiple is two (as indicated by the presence of two genies) but in other examples alternative multiples may be deployed and indicated using alternative visual characteristics of the reveal state of the prize award symbol.

Figure 17:
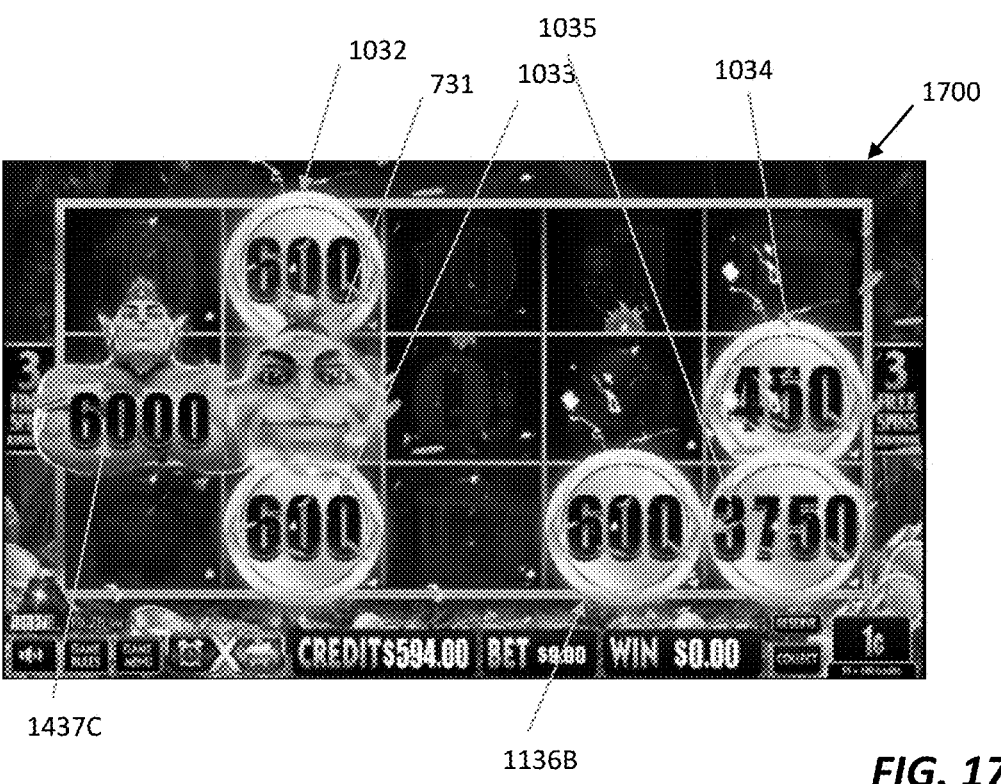
Figure 18:
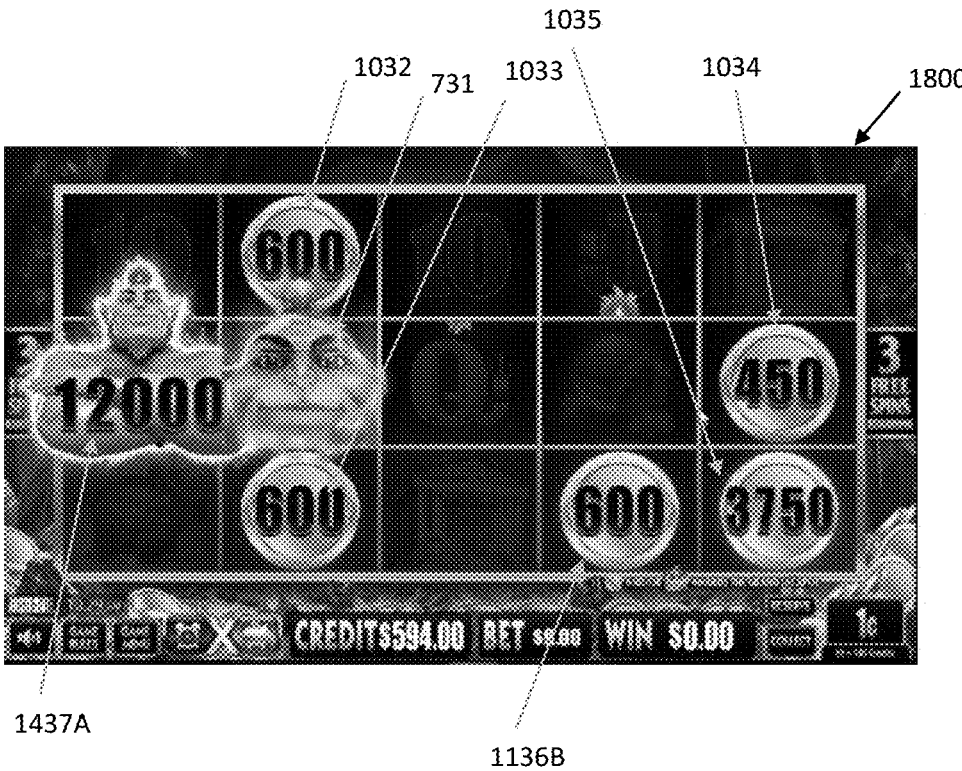

In this example, displaying the updated total involves an interim step exemplified by screen display 1700 of FIG. 17 where the repeat win prize award symbol is displayed in a repeat win state 1437C in which the background genie has been removed and there is only a foreground genie. This is intended to communicate to the user that the background genie has been moved to the foreground to repeat the previous win. Then, as shown in the screen display 1800 of FIG. 18, the prize award symbol is displayed in total win state 1437D to show the updated total prize value which, in this example, is 12000 credits. Accordingly, it will be appreciated that a repeat win prize 1437E symbol has multiple award states showing an initial win value, the repeat win, and the total win value.

Processor 204 then proceeds to step 654 and awards the total value of the prize before proceeding to step 655 and randomly setting a prize value for the prize symbol. In this example, a value of 600 credits as shown by prize symbol 1437E in a subsequent game instance shown in FIG. 19.

Figure 19:
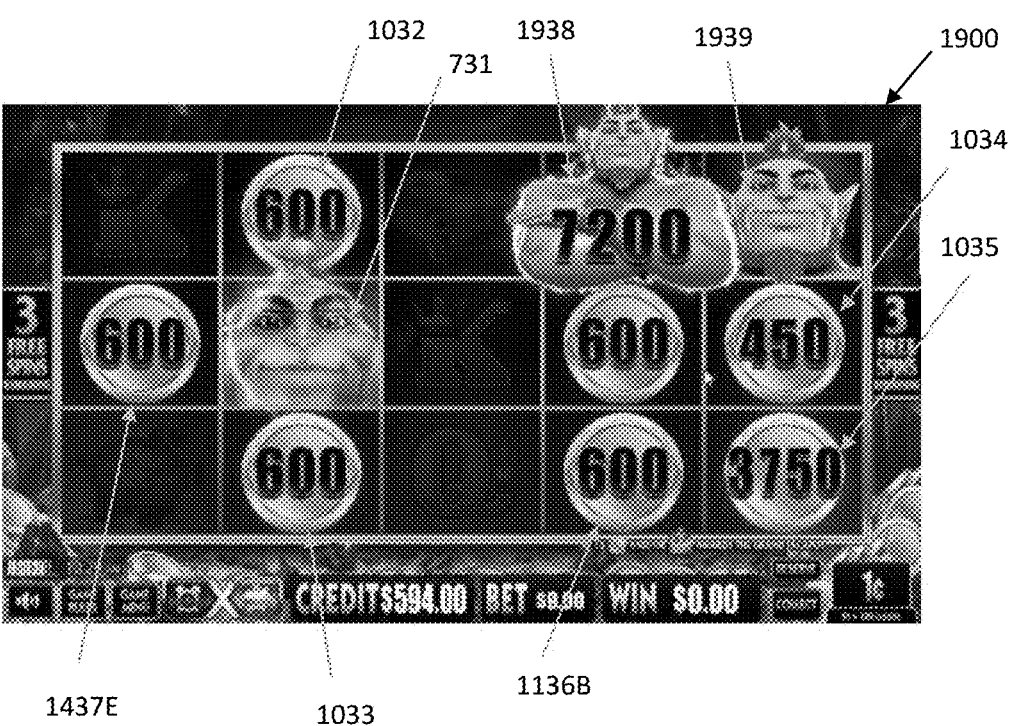
Figure 20:
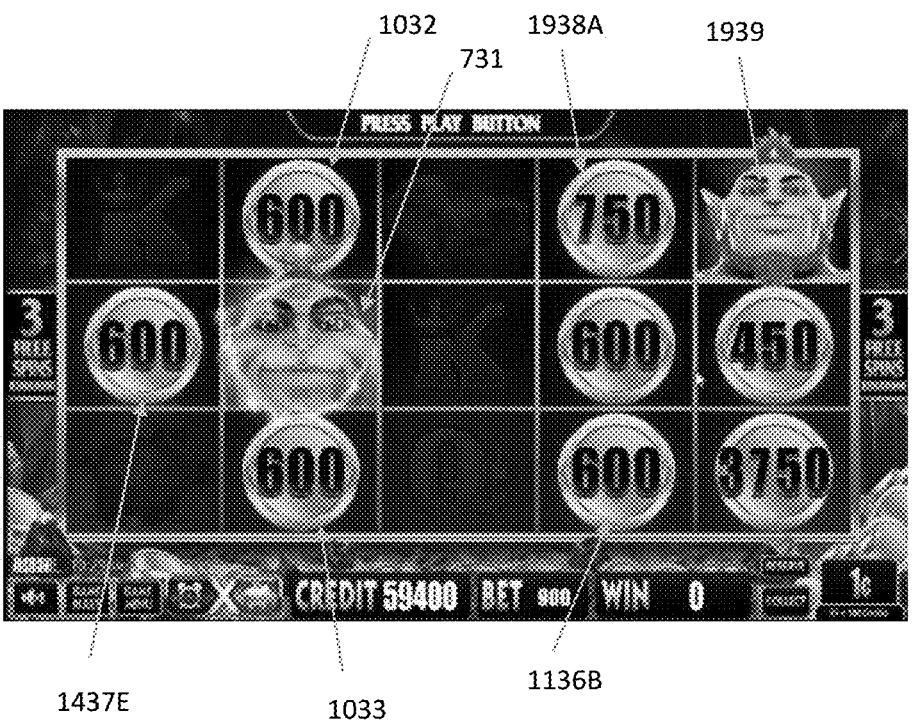
Figure 21:
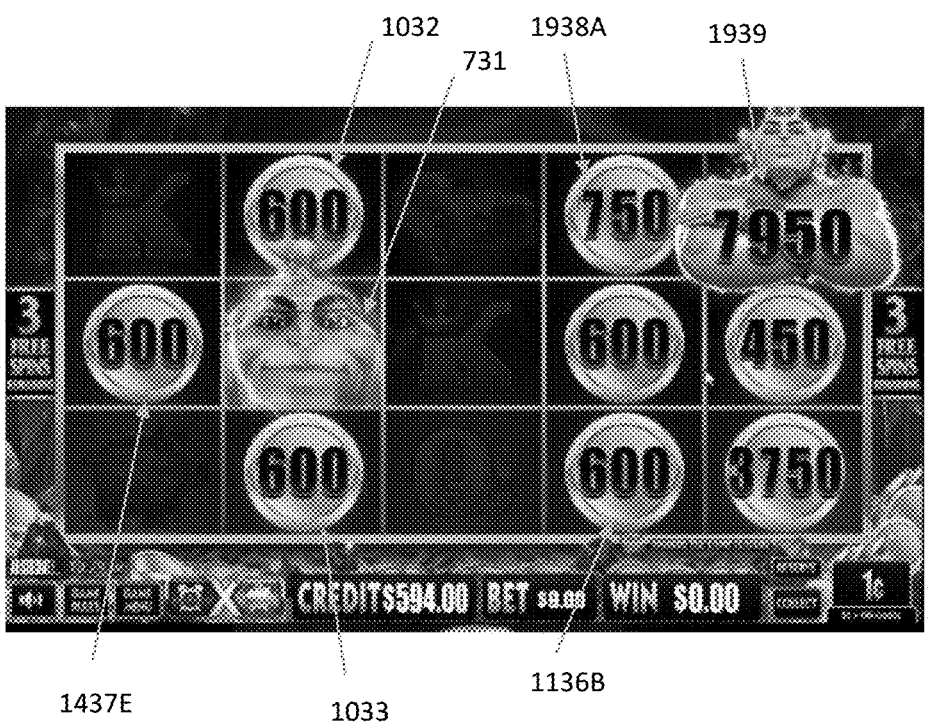
Figure 22:

FIGS. 19 to 21 illustrate an example where more than one prize award symbol has been selected in a game instance. FIG. 19 is an example screen display 1900, where two new prize award symbols 1938,1939 have been selected by processor 204 and accordingly will be evaluated in a defined sequence. In this example, first prize award symbol 1938 is evaluated first because it is the leftmost of the two prize award symbols 1938, 1939. In screen display 1900, at step 651 processor 204 has controlled the display to show the first prize award symbol 1938 in a prize award state showing a total prize of 7200 credits. First prize award symbol 1939 is not a repeat win prize symbol accordingly, processor 204 proceeds to step 654 and awards the prize value of 7200 credits.

Then at step 655, processor 204 sets the value of a first prize symbol 1938A corresponding to the first prize award symbol to 750 credits as shown in the example screen display 2000 of FIG. 20.

In this example, when the processor 204 reaches step 656, the processor 204 will determine that it has not yet processed the last new prize award symbol. In this example, second prize award symbol 1939 and accordingly processor 204 reverts to step 651 and determines and displays a total value of the current prize values for the second prize award symbol. This determination takes into account the displayed value of the first prize symbol 1938A and accordingly results in a display of a prize of 7950 credits as shown in the example screen display 2100 of FIG. 21 where second prize award symbol is displayed in a prize award state 1939A. Again, in this example, second prize award symbol is not a repeat win prize award symbol and accordingly, processor 204 awards the total value of 7950 credits at step 654 before setting a prize value for the second prize symbol (not shown). In this iteration, at step 656 processor 204 determines that second prize award symbol is the last new prize award symbol and hence reverts to step 660.

At step 660 processor 204 determines if all symbol positions are occupied with a prize symbol. If processor 204 makes a negative determination at step 655, processor 204 reverts to step 605 and resets the counter to N (in this example 3) before iterating through steps 610 to 630 again (and then through further steps that depend on whether or not one or more new prize award symbols are selected).

As indicated above, when processor 204 determines at step 640 that the counter reaches zero (that is, after all the hold and spin games have been conducted), processor 204 makes and award of prizes shown by the prize symbols at step 645.

Then, at step 670, the processor 204 determines whether the displayed symbols include an extra play prize symbol. In this example, extra play prize symbol 731 has been present since the start of feature game and accordingly, processor 204 proceeds to step 675 and conducts the extra game play.

Screen display 2200 of FIG. 12 indicates that in this example, the extra game play is processor 204 randomly selecting a prize from a prize wheel 2210. In this example, processor 204 selects one of the prizes on the prize wheel using RNG 212 and a weighted table and then controls the prize wheel as spinning relative to prize indicators 2220 before stopping at a position where the selected prize 2230 is displayed. In the example, the selected prize 2230 is 27000 credits.

While in this example, prize values are displayed as credit values, prize values could also be displayed as currency values.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:
a user interface comprising a spinnable reel display having a plurality of symbol positions;
at least one memory with computer executable instructions and a set of award tables stored thereon, the set of award tables including a first award table including a first set of credit values and a second award table including a second set of credit values, wherein each of the second set of credit values is greater than any of the first set of credit values; and
a game controller comprising at least one processor in communication with the at least one memory and the user interface, wherein the instructions, when executed by the at least one processor, cause the at least one processor to:
cause a set of symbols to be displayed on the spinnable reel display including one or more trigger symbols;
determine that a feature game has been triggered based on the set of symbols displayed on the reel display;
in response to transitioning to the feature game, cause at least one of the one or more trigger symbols displayed on the reel display to transition to a respective credit symbol that includes a respective credit value, wherein the respective credit value for each of the one or more trigger symbols is randomly selected from a first set of credit values by performing a lookup within the first award table of the set of award tables stored in the at least one memory based on a random number generator (RNG) output;
cause the reel display to spin for the plurality of symbol positions that do not include one of the credit symbols;
cause a new trigger symbol to be displayed in one of the spinning symbol positions;
cause the new trigger symbol to transition to a new credit symbol; and
if a total number of credit symbols displayed on the reel display meets a first threshold value, randomly assign a new credit value to the new credit symbol by performing a lookup operation within the second award table of the set of award tables stored in the at least one memory based on another RNG output.

2. The electronic gaming device of claim 1, wherein the game controller is further configured to access the set of award tables to progressively increase subsequent awards displayed to a player in response to each subsequent reel spin of the feature game.

3. The electric gaming device of claim 1, wherein the game controller is further configured to determine and compare a number of credit symbols displayed to the first threshold value, and if the number of credit symbols displayed is below the first threshold value, the game controller may access the first award table.

4. The electronic gaming device of claim 3, wherein if the number of credit symbols displayed is between the first threshold value and a second threshold amount, the game controller may access the second award table, and wherein the second award table includes awards that are greater those of the first award table.

5. The electronic gaming device of claim 4, wherein if the number of credit symbols displayed is greater than the first threshold value, the game controller may access a third award table of the set of award tables, and wherein the third award table includes awards that are greater those of the second award table.

6. The electronic gaming device of claim 1, wherein the new credit value for each new trigger symbol is a multiple of the credit value for each of the one or more trigger symbols.

7. The electronic gaming device of claim 1, wherein the new trigger symbol includes altered visual characteristics of the one or more trigger symbols.

8. A method of operating a gaming device, the method performed by at least one processor in communication with at least one memory with a set of award tables stored thereon, the set of award tables including a first award table including a first set of credit values and a second award table including a second set of credit values, each of the second set of credit values being greater than any of the first set of credit values, the method comprising:
causing a set of symbols to be displayed on a reel display including one or more trigger symbols;
determining that a feature game has been triggered based on the set of symbols displayed on the reel display;
in response to transitioning to the feature game, causing at least one of the one or more trigger symbols displayed on the reel display to transition to a respective credit symbol, each respective credit symbol including a respective credit value, wherein the respective credit value for each of the one or more trigger symbols is randomly selected from a first set of credit values by performing a lookup within the first award table of the set of award tables stored in the at least one memory based on a random number generator (RNG) output;
causing the reel display to spin for symbol positions that do not include one of the credit symbols;
causing a new trigger symbol to be displayed in one of the spinning symbol positions;
causing the new trigger symbol to transition to a new credit symbol; and
if a total number of credit symbols displayed on the reel display meets a first threshold value, randomly assigning a new credit value to the new credit symbol by performing a lookup operation within the second award table of the set of award tables stored in the at least one memory based on another RNG output.

9. The method of claim 8, further comprising, based upon triggering the feature game, displaying the credit value at a position of the trigger symbol at a point when the feature game was triggered, and holding the credit value in place for a duration of the feature game.

10. The method of claim 8, further comprising accessing the set of award tables to progressively increase subsequent awards displayed to a player in response to each subsequent reel spin of the feature game.

11. The method of claim 8, further comprising comparing a number of credit symbols displayed to the first threshold value, and if the number of credit symbols displayed is below the first threshold value, accessing the first award table.

12. The method of claim 11, wherein if the number of credit symbols displayed is between the first threshold value and a second threshold amount, accessing the second award table, wherein the second award table includes awards that are greater those of the first award table, and wherein if the number of credit symbols displayed is greater than the first threshold value, accessing a third award table of the set of award tables, wherein the third award table includes awards that are greater those of the second award table.

13. The method of claim 8, further comprising configuring a number of the set of symbols displayed on the reel display to be two.

14. The method of claim 8, further comprising configuring the new credit value for each new trigger symbol to be a multiple of the credit value for each of the one or more trigger symbols.

15. The method of claim 8, further comprising configuring each credit value to initially share a visual appearance of the one or more trigger symbols.

16. A non-transitory computer-readable storage medium that includes computer-executable instructions that when executed by at least one processor in communication with at least one memory with a set of award tables stored thereon, the set of award tables including a first award table including a first set of credit values and a second award table including a second set of credit values, each of the second set of credit values being greater than any of the first set of credit values, the instructions cause the at least one processor to:

cause a set of symbols to be displayed on a reel display including one or more trigger symbols;

determine that a feature game has been triggered based on the set of symbols displayed on the reel display;

in response to transitioning to the feature game, cause at least one of the one or more trigger symbols displayed on the reel display to transition to a respective credit symbol, each respective credit symbol including a respective credit value, wherein the credit value for each of the one or more trigger symbols is randomly selected from a first set of credit values by performing a lookup within the first award table of the set of award tables stored in the at least one memory based on a random number generator (RNG) output;

cause the reel display to spin for symbol positions that do not include one of the credit symbols;

cause a new trigger symbol to be displayed in one of the spinning symbol positions;

cause the new trigger symbol to transition to a new credit symbol; and if a total number of credit symbols displayed on the reel display meets a first threshold value, randomly assign a new credit value to the new credit symbol by performing a lookup operation within the second award table of the set of award tables stored in the at least one memory based on another RNG output.

17. The non-transitory computer-readable storage medium of claim 16, wherein the at least one processor is further caused to access the set of award tables to progressively increase subsequent awards displayed to a player in response to each subsequent reel spin of the feature game.

18. The non-transitory computer-readable storage medium of claim 16, wherein the at least one processor is further caused to display the credit value at a position of the one or more trigger symbols at a point when the feature game was triggered and holding the credit value in place for a duration of the feature game.

19. The non-transitory computer-readable storage medium of claim 16, wherein the at least one processor is further caused to configure the new credit value for each new trigger symbol to be a multiple of the credit value for each of the one or more trigger symbols.

20. The non-transitory computer-readable storage medium of claim 16, wherein the new trigger symbol to comprise an altered visual characteristics of the one or more trigger symbols.

* * * * *